Figure 1:
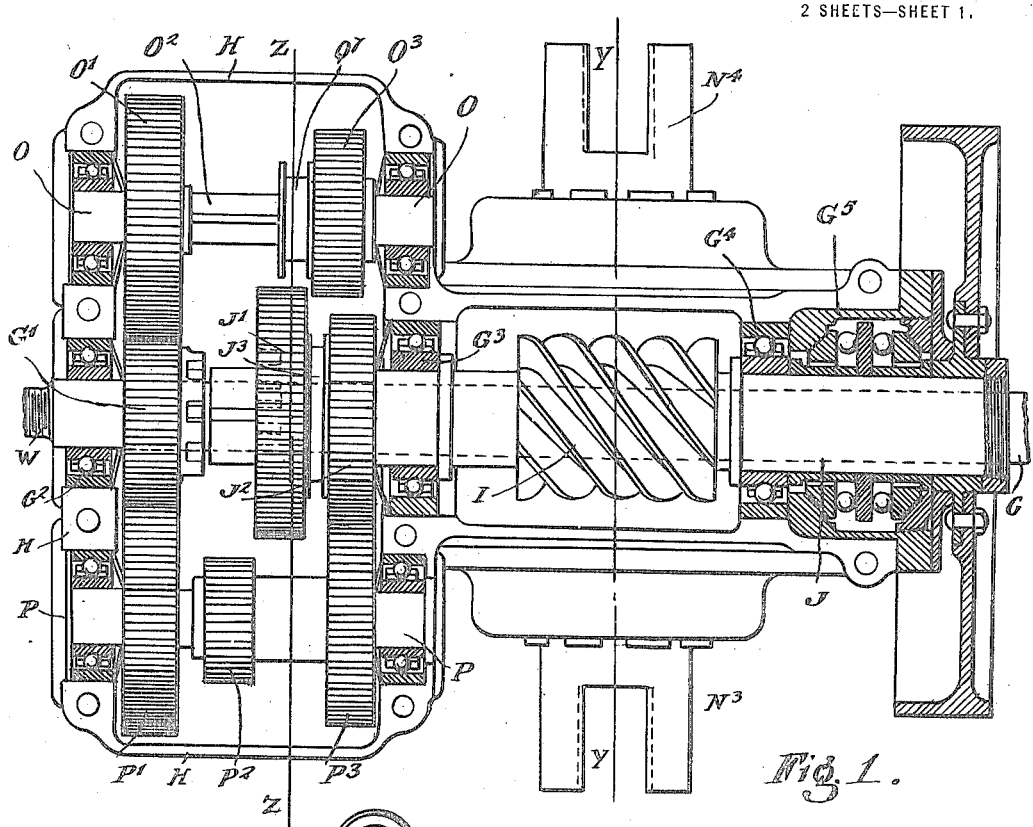

R. W. VINING.
MOTOR VEHICLE.
APPLICATION FILED JUNE 17, 1912.

1,207,246.

Patented Dec. 5, 1916.
2 SHEETS—SHEET 1.

Inventor
Robert Willoughby Vining

UNITED STATES PATENT OFFICE.

ROBERT WILLOUGHBY VINING, OF LONDON, ENGLAND.

MOTOR-VEHICLE.

1,207,246.   Specification of Letters Patent.   Patented Dec. 5, 1916.

Application filed June 17, 1912. Serial No. 704,180.

*To all whom it may concern:*

Be it known that I, ROBERT WILLOUGHBY VINING, a subject of the King of Great Britain, and a resident of 2A Loftus road, Shepherds Bush, London, W., England, have invented new and useful Improvements in and Relating to Motor-Vehicles, of which the following is the specification.

This invention relates to improvements in motor vehicles, and in particular to an improved construction and arrangement for providing a front drive in motor vehicles of that type in which Ackermann steering is employed, that is to say, an arrangement by which the power is transmitted from the engine placed in the front of the vehicle to the front axle.

In this invention I provide a gear box which is either securely bolted to the crank chamber of the engine, or is cast in one therewith in the manner usually known as *en bloc*. The engine and gear box are mounted in any suitable and convenient manner secured to the front of the frame in the front of the vehicle, and the gear box is in front of the engine. The engine and gear box are rigidly secured to the main frame of the vehicle or to a subsidiary frame suspended by springs therefrom, or the said engine and gear box *en bloc* may be supported by a flexible three point support from the front of the said frame. The said gear box may inclose the driving and releasing clutch as well as the change speed gear, but the clutch is in the preferred construction outside the box. A portion of the flexible front drive axle provided with differential gear is mounted in bearings fitted transversely in the said gear box. I provide on the said clutch shaft in alinement with the crank shaft, a worm mounted upon or formed integrally with a sleeve adapted to rotate independently of the said shaft, or be locked or temporarily secured thereto at will. The said shaft conveniently extends through the front of the said gear box in order to carry the starting handle with ratchet spring connection at the front end thereof. I provide a toothed gear wheel of the spur type which is rigidly secured to the said shaft within the said box, preferably at the front end thereof. The said gear wheel meshes with a pinion secured to and mounted upon another shaft parallel with the said clutch shaft. I provide upon the said parallel shaft two or three other pinions preferably keyed thereto, but the said pinions may be formed integrally with the said parallel shaft. On the said worm sleeve are mounted two or more gear wheels, adapted to slide upon a square formed on the said sleeve in such a manner that they always rotate therewith, but may freely slide longitudinally thereon. One of the said sliding pinions is provided with dog teeth adapted to clutch with corresponding dog teeth on the face of the said gear wheel which is rigidly secured to the clutch shaft. The gear wheels on the worm sleeve are adapted to slide thereon in order to change the gear driving wheel by causing the teeth of the one or other wheel to engage with the corresponding pinion on the parallel shaft. Forked levers or like suitable means are provided for each sliding wheel on the sleeve for effecting the change. The threads or teeth of the said worm engage the teeth of a worm wheel mounted on the central portion of the front axle, which as before stated passes transversely through the gear box, and carries the differential.

By the described construction when one of the sleeve gear wheels is brought into engagement with the corresponding pinion on the parallel shaft the power is transmitted through the worm sleeve, the worm wheel, and differential to the front axle. Or to obtain the third and direct drive speed, the forward gear wheel upon the said worm sleeve is caused to engage with the dog clutch before referred to in order to drive the worm directly and at the same speed as the clutch shaft. The usual separate pinion is provided in the gear box for reversing, or reversing may be obtained by other suitable means. The said construction provides a very simple arrangement of three speeds and reverse with a worm drive for the front axle of a motor vehicle. Four speeds may be provided by the addition of other gears, but in the preferred construction only three speeds are provided. The front live axle is connected to the front driving wheels by means of Cardan joints. And in order that my invention may be completely understood reference should be made to the accompanying sheets of drawings in which one example of my invention is illustrated.

Figure 4:
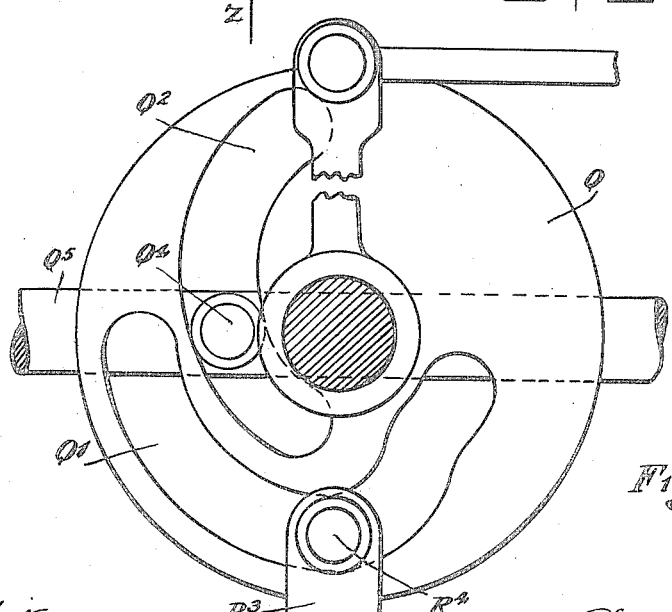
Figure 2:
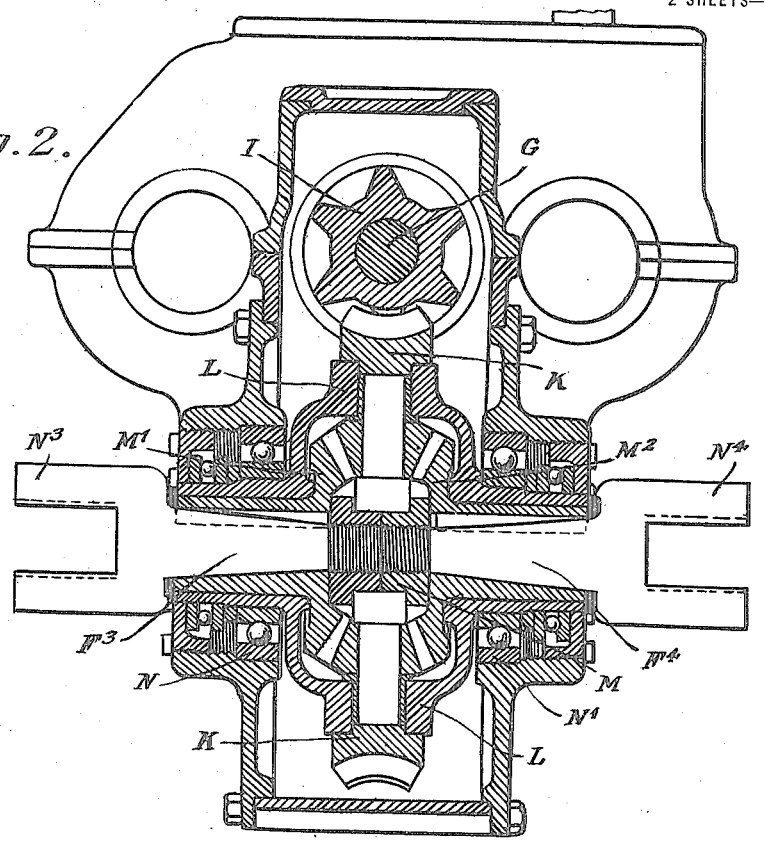
Figure 3:
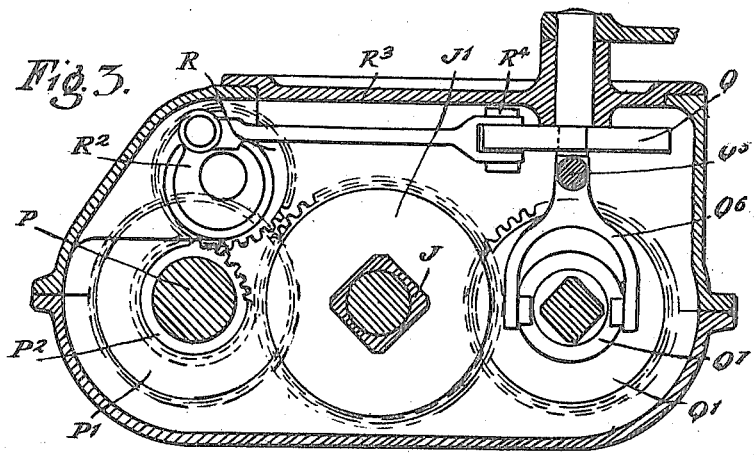

Figure 1 is a plan view of the gear box and gears with the upper part of the casing and the reverse pinion removed; Fig. 2 is a sectional view on line Y—Y of Fig. 1; Fig. 3 is a sectional view on line Z—Z of Fig. 1; and Fig. 4 is a detailed view of the means for operating the gearing.

Referring to the drawings, G is the driving shaft in alinement with the crank shaft. $G^1$ is the spur wheel which is rigidly secured thereto. The end W of this shaft projects through the front end of the box or casing H. On the end W of the shaft G the starting handle is fitted (not shown). The shaft G is mounted in ball journal bearings $G^2$, $G^3$, $G^4$, and thrust bearings $G^5$. The worm I is integrally formed with the sleeve J. The sleeve J is mounted to freely rotate upon the shaft G. The spur wheels $J^1$ $J^2$ are mounted on the square section portion of the sleeve J in such manner that they may slide longitudinally but must always rotate therewith. The wheels $J^1$ $J^2$ are preferably integrally formed with the groove $J^3$ between them into which fits the fork of the operating lever (not shown). The face of the wheel $J^1$ is provided with recesses adapted to fit the dog teeth shown which are integrally formed with the wheel $G^1$. The worm I engages with the worm wheel K. The worm wheel K is mounted upon the casing L of the differential gear M, which drives the front live axle F. Each of the side bevel wheels $M^1$ $M^2$ of the differential is secured to the portions of the live axle $F^3$ $F^4$. These central portions of the live axle are mounted in ball bearings N $N^1$, in the gear box H and are provided outside the said box with hooks or Cardan joints $N^3$ $N^4$, half of each of which is shown in Fig. 2. When the said wheels $J^1$ $J^2$ are slid into engagement with the jaw or dog clutch on the spur wheel $G^1$, the shaft G and the worm I are joined together and rotate as one shaft; consequently there is a through drive direct from the engine to the worm and the front live axle. This is the highest speed provided.

The short shaft O is mounted in ball bearings in the box H. The spur wheel $O^1$ is either integrally formed with the shaft O or rigidly secured thereto. The shaft O is provided with a square $O^2$ upon which the spur wheel $O^3$ is adapted to slide. The wheel $O^1$ is always in mesh with the wheel $G^1$ on the shaft G. To obtain the low or slowest speed of the gear, the wheel $O^3$ is slid into engagement with the spur wheel $J^1$, out of engagement with the dog clutch on the wheel $G^1$. The drive to the live axle worm wheel is then transmitted by the wheels $G^1$ $O^1$, shaft O, and wheels $O^3$ and $J^1$, thence by the worm to the said worm wheel.

The shaft P is mounted in ball bearings on the other side of the box H. It is provided with the spur wheels $P^1$ $P^2$ and $P^3$ all rigidly secured to the shaft P. The wheel $P^1$ is always in mesh with the driving wheel $G^1$ on the shaft G. To obtain the second or intermediate of the three speeds provided, the gears are in the position shown in Fig. 1, the drive being transmitted through the wheel $G^1$ to the wheel $P^1$ and by the wheel $P^3$ to the wheel $J^2$ on the worm sleeve. To obtain the reverse drive, the wheels $J^1$ $J^2$ are slid forward by the mechanism afterward described until the wheel $J^2$ is out of engagement with the wheel $P^3$ and $J^1$ is opposite the wheel $P^2$, and not in engagement with the dog clutch. In this position an eccentric pinion R, Fig. 3, of the lathe head pattern, but not shown in Fig. 1, is brought into engagement with both the wheels $J^1$ and $P^2$. The reverse drive is then by way of the wheels $G^1$ $P^1$ $P^2$ eccentric pinion R, the wheel $J^1$ and the worm I.

Referring to Figs. 3 and 4, the cam disk Q is provided with two cam grooves $Q^1$ $Q^2$. The cam groove $Q^2$ has the pin $Q^4$ fitted and adapted to slide therein as the disk is turned by the driver by means of the link. The pin $Q^4$ is mounted on the rod $Q^5$ which is adapted to slide longitudinally in guides provided inside the casing of the gear box H. The rod $Q^5$ is provided with a fork $Q^6$ which fits the groove $Q^7$ in the spur wheel $O^3$, by which it is moved on the square $O^2$ of the shaft O. The cam disk Q is connected up by links to the driving handle Fig. 3. The reverse pinion R is mounted on the eccentric bearing $R^2$. The eccentric is connected by the rod $R^3$ to the pin $R^4$ which fits in the cam groove $Q^1$ of the cam disk Q. As the pin or spindle of the cam disk Fig. 3 is rotated, the cam grooves slide the pair of wheels on the sleeve J and the wheel on the shaft O in accordance with the respective curves of the cam grooves.

What I do claim as my invention and desire to secure by Letters Patent is:—

1. In combination with a driven axle and change speed gear box of a front drive motor vehicle, a drive shaft, a sleeve adapted to rotate on the drive shaft, or be clutched with same at will, said sleeve having a worm integral therewith, a gear casing, said worm engaging the teeth of a worm wheel mounted in bearings in the gear casing, and spur wheels slidably mounted upon said worm sleeve adapted to drive the sleeve.

2. In combination with a driven axle of a front drive motor vehicle, a drive shaft in alinement with the engine, a worm integrally formed with a sleeve, adapted to rotate freely upon the drive shaft, means for clutching the shaft and sleeve together, spur wheels adapted to slide on said sleeve to drive said sleeve, a spur wheel secured to said drive shaft and adapted to be clutched to one of the first mentioned wheels, and a worm wheel mounted on the differential gear of the drive axle, said worm wheel being in engagement with the first mentioned worm.

3. In combination with a driven axle and change speed gear box of a front drive motor vehicle, a drive shaft extending into the gear box, a sleeve supported on the drive shaft, means on the forward end of the sleeve for clutching the sleeve to the shaft, a worm integral with the sleeve, a gear casing having a worm wheel in mesh with the worm of the sleeve, differential gearing in the casing, and means for connecting the said gearing with the drive axle substantially as described.

4. In combination with a driven axle and change speed gear box, a drive shaft, a sleeve rotatably mounted on the drive shaft, said sleeve carrying a worm, means for moving the sleeve into and out of clutch relation with the drive shaft, a differential gear casing carrying a worm wheel which meshes with the worm on the sleeve, and spur wheels mounted in the said box adapted by selective engagement to coöperate with said worm and worm wheel for driving the said axle at varying speed.

5. In combination with a driven axle and change speed gear box, a drive shaft extending through the gear box, a sleeve mounted on the drive shaft, a worm on the sleeve, a worm wheel in mesh with said worm, a differential gear operating in conjunction with the worm wheel, drive axle parts extending into the differential casing, a rod carrying gear engaging means, said gear engaging means adapted to embrace one of the wheels of the gear box, a cam disk associated with the gear engaging means, whereby movement of the cam disk moves the wheel engaged by the gear engaging means into operation for changing speed.

ROBERT WILLOUGHBY VINING.

Witnesses:
  I. D. ROOTS,
  O. J. WORTH.